US009088718B2

(12) United States Patent
Tsubaki

(10) Patent No.: US 9,088,718 B2
(45) Date of Patent: Jul. 21, 2015

(54) IMAGING APPARATUS AND CONTROL METHOD THEREFOR

(71) Applicant: CANON KABUSHIKI KAISHA, Tokyo (JP)

(72) Inventor: Hidetoshi Tsubaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/202,016

(22) Filed: Mar. 10, 2014

(65) Prior Publication Data

US 2014/0267809 A1 Sep. 18, 2014

(30) Foreign Application Priority Data

Mar. 12, 2013 (JP) ................................. 2013-049252

(51) Int. Cl.
*H04N 5/228* (2006.01)
*H04N 5/232* (2006.01)
(52) U.S. Cl.
CPC ................................. *H04N 5/23267* (2013.01)
(58) Field of Classification Search
CPC .......... H04N 5/23248; H04N 5/23251; H04N 5/23254; H04N 5/23258; H04N 5/23264; H04N 5/23267; H04N 5/23277
USPC ........ 348/208.99, 208.1–208.7; 382/293–298
See application file for complete search history.

(56) References Cited

U.S. PATENT DOCUMENTS

| | | | | |
|---|---|---|---|---|
| 5,107,293 A * | 4/1992 | Sekine et al. .................... 396/55 |
| 5,502,482 A * | 3/1996 | Graham ........................ 348/140 |
| 5,629,988 A * | 5/1997 | Burt et al. ...................... 382/276 |
| 6,396,961 B1 * | 5/2002 | Wixson et al. ................. 382/294 |
| 6,628,711 B1 * | 9/2003 | Mathew et al. ........... 375/240.12 |
| 7,692,688 B2 | 4/2010 | Kurata |
| 8,284,262 B2 | 10/2012 | Tanaka |
| 8,294,773 B2 * | 10/2012 | Oshino et al. ............... 348/208.6 |
| 8,363,114 B2 | 1/2013 | Tanaka |
| 8,922,664 B2 * | 12/2014 | Oshino et al. ............ 348/208.99 |
| 2007/0297694 A1 | 12/2007 | Kurata |
| 2010/0215353 A1 * | 8/2010 | Hashi et al. ..................... 396/55 |
| 2010/0245603 A1 * | 9/2010 | Hashi et al. ................ 348/208.5 |
| 2012/0092511 A1 * | 4/2012 | Wakamatsu ............... 348/208.2 |

FOREIGN PATENT DOCUMENTS

| | | | |
|---|---|---|---|
| JP | 2007215114 A | 8/2007 |
| JP | 4178481 B2 | 11/2008 |
| JP | 4692620 B2 | 6/2011 |

* cited by examiner

Primary Examiner — Kelly L Jerabek
(74) Attorney, Agent, or Firm — Fitzpatrick, Cella, Harper & Scinto

(57) ABSTRACT

An imaging apparatus includes a first image shake correcting unit for correcting image shake and moves a correction lens in a direction perpendicular to the optical axis using detection information obtained by an attitude detection sensor. In a second image shake correcting unit, a translational motion detecting unit acquires information about an image captured by an imaging element from a pre-processing unit so as to detect the motion of the image in the translational direction. An in-plane rotational motion detecting unit detects the motion of the image in the rotational direction about the optical axis. A geometric deforming unit acquires detection information from the translational motion detecting unit and the in-plane rotational motion detecting unit so as to correct the image shake of the corrected image, which occurs when the image is subject to rotational correction based on the detection information obtained from the in-plane rotational motion detecting unit.

8 Claims, 3 Drawing Sheets

IMAGING APPARATUS AND CONTROL METHOD THEREFOR

BACKGROUND OF THE INVENTION

1. Field of the Invention

The present invention relates to a technique for improving the image shake correction performance of an imaging apparatus.

2. Description of the Related Art

In imaging apparatuses, there has been a demand for advanced image shake correction functions for moving images. For example, there has been a demand for advanced functions for detecting and correcting image shake caused by hand vibration or the like in the in-plane rotational direction and rolling shutter distortion accompanied therewith. In interchangeable lens-type imaging apparatuses, there has been proposed a method for performing electronic image shake correction within a camera body for a captured image in conjunction with an optical image shake correction mechanism provided within an independently operating lens. Accumulated shake caused by shake or motion of an image in the vertical direction and the horizontal direction, which is the main element of the high-frequency components of hand vibration, is suppressed by optical image shake correction. On the other hand, the low-frequency components of shake of large amplitude and shake in the in-plane rotational direction, which cannot be suppressed by optical image shake correction, are suppressed by geometric deformation by electronic image shake correction.

Japanese Patent Laid-Open No. 2007-215114 discloses a technique for suppressing rolling shutter distortion, which is caused by employing a CMOS sensor and cannot be completely suppressed by optical image shake correction, by geometric deformation by electronic image shake correction. In addition, Japanese Patent No. 4178481 discloses a technique for suppressing the motion of an image other than shake of an image in the vertical direction and the horizontal direction which cannot be suppressed by optical image shake correction, i.e., the motion of an image in the in-plane rotational direction, by geometric deformation by electronic image shake correction.

In recent years, there has been a demand for a technique for dealing with not only shake caused by hand vibration but also shake caused by so-called "shooting while walking" by expanding an angle range in which image shake can be corrected mainly at the wide-angle end side. Japanese Patent No. 4692620 discloses a technique for removing the range limit of centering on optical image shake correction or the range limit of margin pixels for image shake correction on electronic image shake correction by intentionally releasing the low-frequency components of shake and not completely stopping the motion of an object image.

On the other hand, in imaging apparatuses having the integral functions of still image shooting and moving image shooting, an image shake correction system (hybrid image shake correction) that combines optical image shake correction and electronic image shake correction is employed. A hybrid image shake correction mechanism is expanding its loading area from the moving image shooting function of the conventional camera dedicated for moving image shooting to the moving image shooting function of an interchangeable lens-type imaging apparatus mainly used for still image shooting. With the aid of the moving image shooting function which can withstand the full-fledged shooting in an imaging apparatus, there has been a demand for achieving the advanced image shake correction function while maintaining the characteristic of the image shake correction function or the like upon shooting while walking.

When performing the hybrid image shake correction that combines optical image shake correction and electronic image shake correction, it is important for electronic image shake correction to obtain operation information about optical image shake correction so as to grasp what type of image shake correction has been carried out by optical image shake correction in terms of functional improvement. However, in the case of an interchangeable lens-type imaging apparatus, if an attempt is made to process operation information about an independently operating optical image shake correction mechanism provided within a lens barrel by transferring the operation information to the imaging apparatus main body, a significant system change is required. The conventional lens group is not designed to meet such a specification. Thus, in the communication mode between the camera and the lens, content information sufficient for image shake correction may not be transferred from the lens to the camera main body or the camera itself may not even have a mechanism for transferring state information about the image shake correcting operation. In addition, a system-level change in the interchangeable lens-type imaging apparatus cannot deal with an interchangeable lens which has already been used by a user, resulting in a significant disadvantage.

On the other hand, when in-plane (direction about the optical axis) rotational motion correction is further performed on an image obtained by optical image shake correction based on information about an attitude sensor mounted on the camera main body, such in-plane rotational motion correction may lead to oscillation of the translational motion correction remaining component for optical image shake correction. The negative effects become noticeable in the case of shooting while walking where the low-frequency components of shake are intentionally released and the motion of an object image is not completely stopped. In the mechanism or the like capable of dynamically switching the shut-off motion as disclosed in Japanese Patent No. 4692620, the negative effects become further noticeable when the cutoff frequency in the yaw direction largely differs from that in the pitch direction.

SUMMARY OF THE INVENTION

The present invention provides an imaging apparatus that performs optical image shake correction for hand vibration or the like and image shake correction by image processing so as to suppress the negative effects that occur when image rotational correction is performed by electronic image shake correction after performing optical image shake correction.

According to an aspect of the present invention, an imaging apparatus is provided that includes an imaging unit configured to capture an object via an optical system; and image shake correcting unit configured to correct image shake of an image captured by the imaging unit, wherein the image shake correcting unit includes a first image shake correcting unit configured to optically correct the image shake of the image by the motion of an optical member; and a second image shake correcting unit configured to perform image shake correction by processing the image captured by the imaging unit, and wherein the second image shake correcting unit includes a first detecting unit configured to detect motion of the image in a translational direction in a plane perpendicular to the optical axis of the optical system as a translational motion amount from the image optically corrected by the first image shake correcting unit; a second detecting unit configured to detect motion of the image in a rotational direction about the optical axis of the optical system as a rotational motion amount; and a geometric deforming unit configured to acquire the translational motion amount and the rotational motion amount, perform correction by rotating the captured image in accordance with the rotational motion amount with respect to the translational motion amount, and calculate a tangential directional component of the motion of the image in the translational direction generated by the correction so as to correct the motion of the image by geometric deformation processing.

According to the present invention, an imaging apparatus that performs optical image shake correction and image shake correction by image processing so as to suppress the negative effects that occur when image rotational correction is performed by electronic image shake correction after performing optical image shake correction may be provided.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings. For image shake correction, first image shake correction processing for optically correcting an image shake of an image by offsetting the optical axis of an imaging optical system by the driving of an optical member is referred to as "optical image shake correction", whereas second image shake correction processing for correcting an image shake of an image captured by an imaging element by electronic processing is referred to as "electronic image shake correction". In optical image shake correction, optical members (lens, prism, and the like), an imaging element, and the like are driven as correction members.

Figure 1:
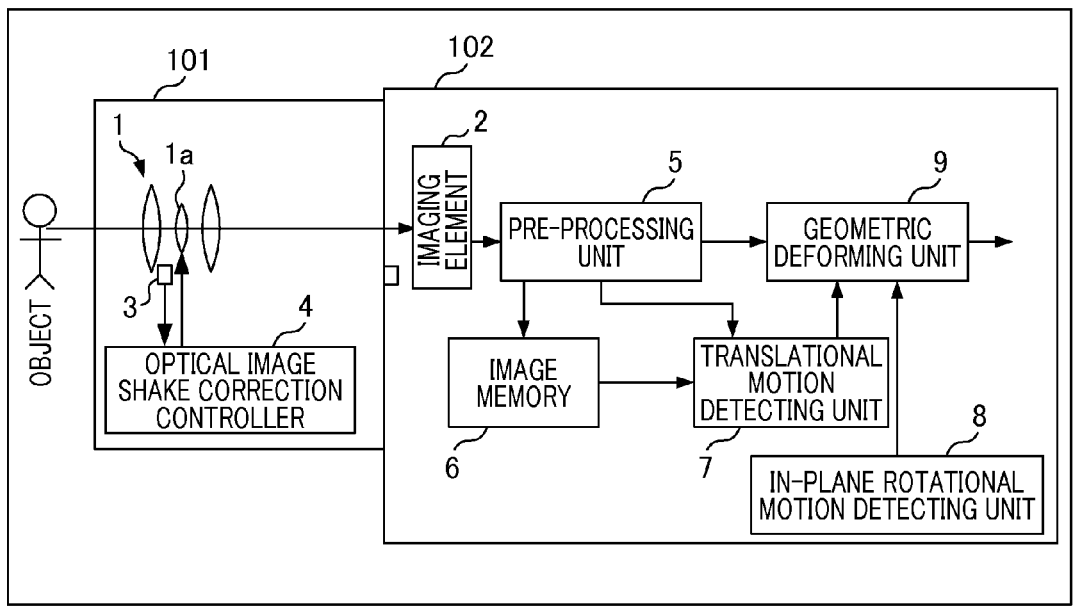
FIG. 1 is a block diagram illustrating an exemplary configuration of an imaging apparatus according to an embodiment of the present invention.

FIG. 1 is a block diagram illustrating an exemplary configuration of an imaging apparatus according to an embodiment of the present invention. An imaging apparatus 100 includes a lens barrel 101 and a camera main body 102. The imaging apparatus 100 is a video camera provided with an optical image shake correction mechanism that operates within the lens barrel 101 or a digital camera having a moving image shooting function. Hereinafter, a description will be given of image shake correction processing for moving image performed by an interchangeable lens-type camera upon shooting while walking. Note that a first image shake correcting unit provided in the lens barrel 101 has an optical image shake correction mechanism and a second image shake correcting unit provided in the camera main body 102 performs electronic image shake correction.

The lens barrel 101 has an optical system 1 including the optical image shake correction mechanism, an attitude detection sensor 3, and an optical image shake correction controller 4. The camera main body 102 has an imaging element 2, a pre-processing unit 5, an image memory 6, a translational motion detecting unit 7, an in-plane rotational motion detecting unit 8, and a geometric deforming unit 9.

The optical system 1 is composed of a plurality of lenses, mirrors, and the like in order to focus light reflected from an object on the imaging element 2. The optical system 1 moves a portion of the lenses (hereinafter referred to as "correction lens") 1a in a direction perpendicular to the optical axis to thereby move the position of an optical image on the imaging element 2 in parallel, so that an image shake caused by the vibration of the camera is suppressed.

The attitude detection sensor 3 is composed of a gyro sensor or the like and measures information about a change in attitude of a camera with respect to any limited axis and vibration applied to the camera. The attitude detection sensor 3 detects the change in attitude of the camera in a plurality of axial directions of the optical system 1 (e.g., yaw direction or pitch direction perpendicular to the optical axis) and the vibration applied to the camera. A single multi-spindle attitude sensor may also be employed instead of mounting sensors for each axis.

The optical image shake correction controller 4 performs optical image shake correction processing, and an actuator for image shake correction drives a correction lens 1a. The shift operation of the correction lens 1a is performed based on camera attitude change detection information (shake information) obtained by the attitude detection sensor 3, i.e., camera work information. More specifically, an electromagnetic element using a magnet and a coil is employed as an actuator for image shake correction. The optical image shake correction controller 4 executes time-series processing (more specifically, integration processing) using the attitude change detection information (shake information) obtained by the attitude detection sensor 3 as an input so as to calculate an attitude change correction amount (shake correction amount). Then, the optical image shake correction controller 4 controls the optical image shake correction mechanism (consisting of the actuator for image shake correction and the correction lens 1a) of the lens barrel 101 based on the calculated attitude change correction amount (shake correction amount). Closed loop processing is formed to cancel the motion on the image so that the optical image shake correction processing is performed. The optical image shake correction controller 4 performs filtering processing as integration processing using, for example, an infinite impulse response (IIR) filter or the like. The optical image shake correction controller 4 can adjust image shake correction frequency characteristics, low frequency component releasing characteristics, and the like by adjusting a cut-off frequency, a feedback gain, and the like. The term "low frequency component releasing" refers to cause a filter to intentionally pass through a frequency component having a predetermined threshold value or less by changing a cut-off frequency. In the case of hybrid image shake correction performed by the interchangeable lens-type imaging apparatus 100 in which the lens barrel 101 is used by being mounted on the camera main body 102, image shake correction is electronically performed by image processing. In the present embodiment, when electronic image shake correction is performed by the geometric deforming unit 9 provided in the camera main body 102, optical image shake correction is independently performed from electronic image shake correction.

The pre-processing unit 5 is an image processing unit that performs various processing for an analog image signal photoelectrically converted by the imaging element 2. The various processing includes noise removal by correlated double sampling (CDS), exposure control by auto gain control (AGC) gain up, black level correction, A/D conversion processing, and the like. In order to improve the accuracy and robustness of image translational motion detection processing such as extraction of a feature point in a captured image, calculation of a vector, and the like, an image input to the translational motion detecting unit 7 is subject to gradation adjustment processing such as filtering processing, tone mapping, and the like. In the pre-processing unit 5, the main unit that performs processing for an analog signal is referred to as "AFE" (analog front-end), whereas the circuit unit that is used as a pair with the digital output sensor is referred to "DFE" (digital front-end). The image memory 6 temporarily stores a digital image signal generated by the pre-processing unit 5.

The translational motion detecting unit (first detecting unit) 7 detects the motion of an image in the translational direction in a plane perpendicular to the optical axis of the optical system 1. The translational motion detecting unit 7 detects a motion vector between images so as to calculate a translational motion amount by using an image signal generated by the pre-processing unit 5 and a previous (e.g., one previous frame) image signal accumulated in the image memory 6. At this time, a target image in which a motion vector is to be detected is an image subjected to optical image shake correction. For example, the translational motion amount corresponds to motion amounts $\Delta X$ and $\Delta Y$ at the specific position in the two-dimensional orthogonal coordinate system X-Y of an image. The detected motion vector or translational motion amount (first detection information) is output to the geometric deforming unit 9.

The in-plane rotational motion detecting unit (second detecting unit) 8 detects the motion of an image in the rotational direction motion around the optical axis of the optical system 1. The in-plane rotational motion detecting unit 8 detects the rotational motion (rotational motion amount) of an image around the optical axis (roll direction) in a plane perpendicular to the optical axis of the optical system 1, i.e., in the light-receiving plane of the imaging element 2. For example, the rotational motion amount corresponds to an angle change $\Delta\theta$ at the specific position of an image in the rotational direction around the optical axis. The in-plane rotational motion detecting unit 8 is composed of a gyro sensor or the like. Note that the in-plane rotational motion can also be calculated based on the translational motion between image frames, which has been calculated by the translational motion detecting unit 7, at a plurality of positions on an image. The rotational motion amount (second detection information) detected by the in-plane rotational motion detecting unit 8 is output to the geometric deforming unit 9.

The geometric deforming unit 9 performs time-series processing on detection information about the translational motion amount detected by the translational motion detecting unit 7 and detection information about the rotational motion amount detected by the in-plane rotational motion detecting unit 8 as camera work information. The geometric deforming unit 9 electronically performs geometric deformation processing on image frame data obtained from the pre-processing unit 5 to thereby output the corrected image data. The degree of freedom in the Euclidean (rigid) transformation consisting of the in-plane rotation, the vertical translation, and the horizontal translation is required for the geometric deformation processing. The image data corrected by the geometric deforming unit 9 is temporarily stored in a work memory (DRAM or the like) (not shown) or is directly transferred to a back-end processing unit. Examples of such a back-end processing unit include a recording unit consisting of a semiconductor memory or the like, a display unit such as a liquid crystal display, and an external input/output I/F (Interface) unit. The recording unit records image data on a recording medium. The display unit displays a captured image in a live-view mode or the like. The external input/output I/F unit can receive/transmit data from/to an external device via a wireless LAN (Local Area Network) or a wired cable such as a USB (Universal Serial Bus).

Figure 2A:
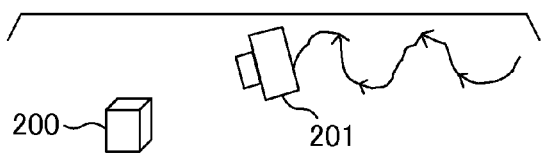
FIGS. 2A to 2C are diagrams illustrating a phenomenon that occurs when in-plane (direction about the optical axis) rotational image shake correction is performed on an image to which optical image shake correction has been performed.
Figure 2B:
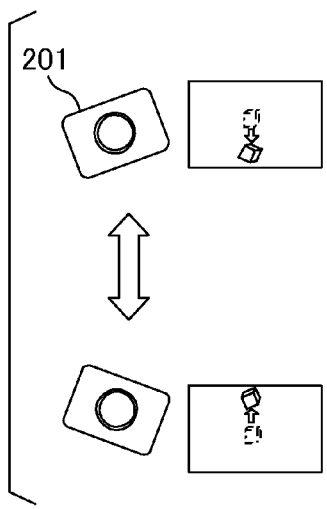
Figure 2C:
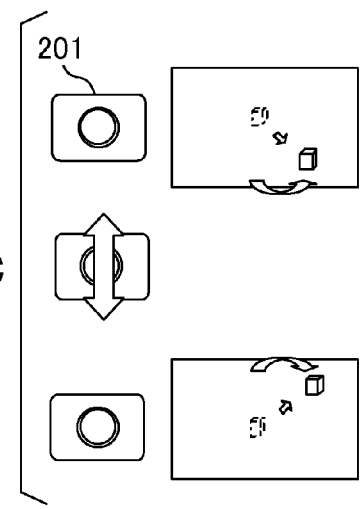

Next, a description will be given of a phenomenon which may occur when an image subjected to optical image shake correction is subject to image shake correction in the in-plane rotational direction by geometric deformation processing with reference to FIGS. 2A to 2C. FIG. 2A shows a state where a photographer takes pictures of a cubic object 200 while walking, that is, a state where a photographer takes pictures of the object 200 while vibrating a camera 201 up and down. In FIGS. 2B and 2C, an image before the change of the object 200 in a captured image is represented by dotted lines and an image after the change of the object 200 in a captured image is represented by solid lines. The arrows represent a translational motion and a rotational motion of the camera 201.

When a photographer takes pictures while walking, optical image shake correction alone may cause an object image to vibrate up and down and rotate in plane as shown in FIG. 2B. In a camera which performs geometric deformation processing by electronic image shake correction, it is required to acquire higher quality image data by correcting the in-plane rotation of an object image. However, if only the rotational motion of an image of which the translational motion alone has been suppressed by optical image shake correction is subsequently electronically suppressed by geometric deformation, the motion of the object image becomes unnatural. As shown in FIG. 2C, an object image moves here and there by the remaining low frequency motion component, so that the object image may move as if it is dancing.

Thus, in the present embodiment, the translational motion is detected from an image obtained by optical image shake correction, and the direction of the remaining accumulated translational motion is controlled in accordance with the correction amount of rotation based on in-plane rotational motion. In this manner, the negative effects caused by additional correction of the rotational motion of an image of which the translational motion has been corrected by optical image shake correction by removing the low frequency motion thereof can be removed.

A description will be given of the occurrence of a new motion of an image by in-plane rotational motion correction and the correction of the motion with reference to FIGS. 3A to 3G. The term "in-plane rotational motion" refers to the motion of an image in the rotational direction (roll direction) around the optical axis in a plane perpendicular to the optical axis. In FIGS. 3A to 3G, the direction of the in-plane rotational motion of an image is illustrated as being discrete from the translational motion (thick line arrow).

Figure 3A:
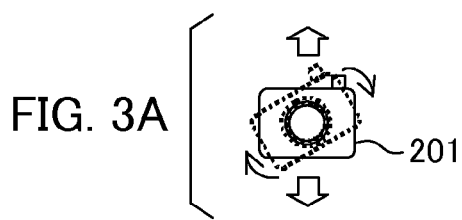
FIGS. 3A to 3G are diagrams illustrating the occurrence of motion of an image by in-plane (direction about the optical axis) rotational motion correction and the correction of the motion.

FIG. 3A is a schematic diagram illustrating an exemplary attitude change of the camera 201 which took an image of which the in-plane rotational motion is to be corrected. For example, in the case of shooting while walking, the camera 201 moves up and down and right and left as shown by the arrows or rotates in the yaw direction or the pitch direction. At this time, the vertical motion of the camera 201 (main motion of the camera 201) occurs at a frequency which does not necessarily correspond to that in the in-plane rotational direction around the optical axis as the rotation axis.

Figure 3B:
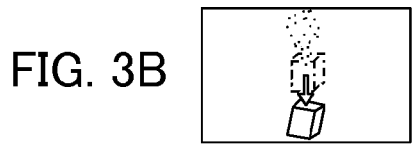
Figure 3C:
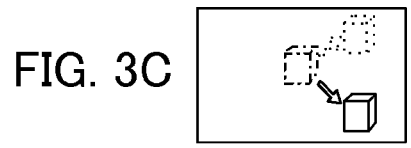

FIG. 3B shows the motion of an image captured by an optical system including an optical image shake correction mechanism with respect to the attitude change of the camera 201 shown in FIG. 3A. An image before the change of the object image is represented by dotted lines. The translational component of the motion of an image is corrected by optical image shake correction by removing the intentionally remaining low frequency motion component. In many cases, the resulting image is an image in which only the in-plane rotational motion noticeably remains in FIG. 3B. The conventional apparatus includes an in-plane rotational motion detecting unit and a geometric deforming unit, and corrects the in-plane rotational motion of an image by in-plane rotational correction processing. FIG. 3C shows the result obtained by the correction of the in-plane rotational motion alone. When the low frequency translational motion which is not suppressed by optical image shake correction is present in the captured image obtained by optical image shake correction, a new motion occurs as a result of in-plane rotational motion correction. In other words, when the in-plane rotational motion is corrected, the trajectory of the intentionally remaining translational motion changes in the vibration direction in accordance with rotational motion correction as shown in FIG. 3C. Thus, a phenomenon in which an image is seen as if it is vibrating anew occurs.

Figure 3D:
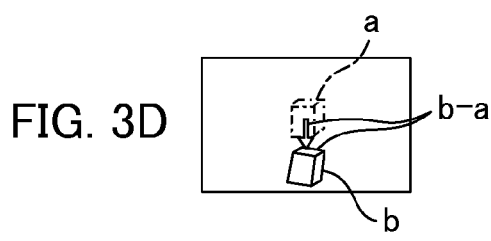

Accordingly, in the present embodiment, as shown in FIG. 3D, a translational motion is firstly detected from the image obtained by optical image shake correction so as to monitor a low frequency motion component on the basis of the integrated amount. More specifically, the translational motion detecting unit 7 detects a motion component between frames of the captured image, and then integrates the motion component by using an IIR-type low pass filter or the like. An image "a" shown in FIG. 3D represents an image serving as a reference point of integration by an IIR-type low pass filter or the like. An image "b" represents an image of current frame. The term "b-a" refers to an integrated amount of integrated translational motions. The integrated amount represents the difference motion of an image between current frame and previous frame by taking the object position as the reference.

Figure 3E:
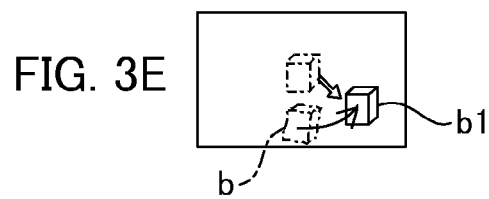
Figure 3F:
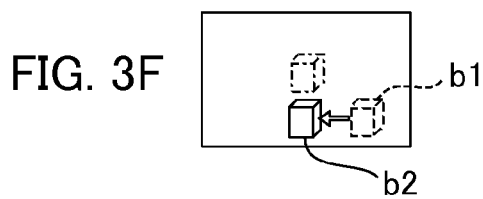
Figure 3G:

FIG. 3E shows a vibration component caused by the side effects of rotational motion correction when the integrated motion component is geometrically deformed by the rotational motion correction amount. An image "b1" represents an image obtained as a result of rotational motion correction for the image "b". This image is obtained by coordinate transformation of the integrated amount of translational motions using the in-plane rotational correction amount. A vibration component caused by the side effects of rotational motion correction is often a difference between the integrated amount of translational components after the actual rotational motion correction and the integrated amount of translational components before the rotational motion correction, that is, a tangential directional component. Hence, as shown in FIG. 3F, a difference (tangential directional component) between the integrated amount of translational components after the rotational motion correction and the integrated amount of translational components before the rotational motion correction is corrected by geometric deformation. An image "b2" represents an image obtained as a result of correction for the image "b1". Consequently, as shown in FIG. 3G, the apparent vibration which newly occurs as a result of in-plane rotational motion correction is corrected for the captured image obtained by optical image shake correction. Hereinafter, a detailed description will be given of correction processing in sequence.

Firstly, a description will be given of the translational motion detecting unit 7. The translational motion detecting unit 7 performs, for example, motion vector calculation processing. A motion vector (motion information) is detected based on image data between a plurality of input frames. More specifically, a motion vector is calculated between the image from the current frame input after being immediately processed by the pre-processing unit 5 and the image from the previous frame input after being temporarily stored in the image memory 6. During motion vector calculation processing, a motion vector between frames or a trajectory between feature points is calculated by template matching, table matching between feature points calculated for each frame, motion vector estimation based on a gradient technique, or the like.

Figure 4:
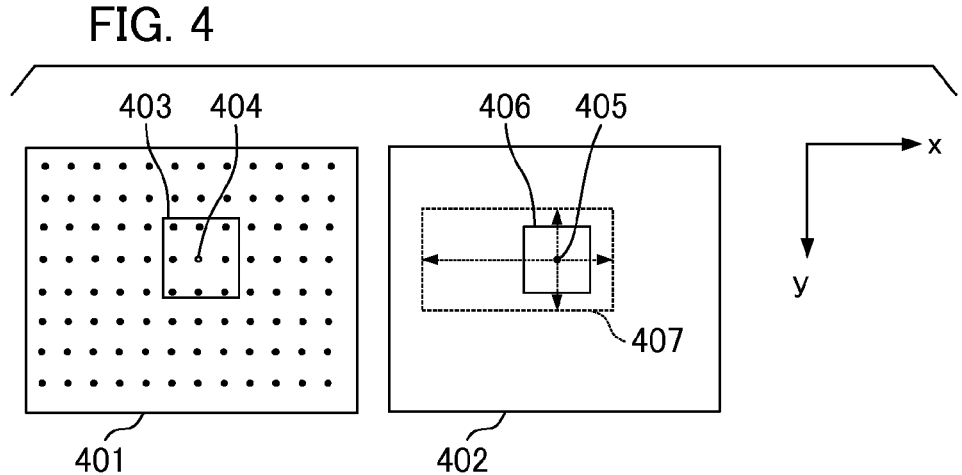
FIG. 4 is a diagram illustrating template matching.

FIG. 4 shows block matching which is a kind of template matching. A first image 401 on the left side of FIG. 4 is a reference image and a second image 402 on the right side of FIG. 4 is an image to be searched. For example, a first image of the previously input frame is taken as a reference image and a second image of the input current frame backward in time is taken as a search image, so that a motion vector between two images is detected. A partial region having a predetermined size about points of interest 404 which are arranged in a matrix grid on the image 401 is set as a template 403. Any search region 407 is set in the search image and processing for searching a position at which the template 403 matches most closely is executed while moving the search region 407 in sequence. Similarity between an image portion in a region 406 by taking a pixel of interest 405 in the image 402 as the reference and an image portion in the template 403 serving as the reference image is calculated. As the index of similarity, SSD (Sum of Square Difference), SAD (Sum of Absolute Difference), or correlation calculation such as normalized cross-correlation is used. When luminance variations between frames become noticeable in the case of photographed image, normalized cross-correlation is mainly used. The calculation formula for the similarity score R of normalized cross-correlation is exemplified as follows:

[Formula 1]

$$R(x, y, x', y') = \frac{\sum_{i=-M_T}^{M_T} \sum_{j=-N_T}^{N_T} \{I_{(x,y)}(i, j) - \bar{I}\}\{I'_{(x',y')}(i, j) - \bar{I}'\}}{\sqrt{\sum_{i=-M_T}^{M_T} \sum_{j=-N_T}^{N_T} \{I_{(x,y)}(i, j) - \bar{I}\}^2} \sqrt{\sum_{i=-M_T}^{M_T} \sum_{j=-N_T}^{N_T} \{I'_{(x',y')}(i, j) - \bar{I}'\}^2}} \quad \text{(Expression 1)}$$

In (Formula 1),

[Formula 2]

$$\bar{I} = \frac{1}{M_T N_T} \sum_{i=-M_T}^{M_T} \sum_{i=-N_T}^{N_T} I_{(x,y)}(i, j),$$

(Expression 2)

$$\bar{I}' = \frac{1}{M_T N_T} \sum_{i=-M_T}^{M_T} \sum_{i=-N_T}^{N_T} I_{(x',y')}(i, j)$$

Coordinates (x, y) and (x', y') indicate the positions of templates in a reference image I and a search image I', respectively. Each of $I_{(x, y)}$ (i, j) and $I_{(x', y')}$ (i, j) indicates a partial image. A bar symbol on top of each of I and I' represents arithmetic mean.

As a result of calculation of all possible similarities for a search region, a motion vector is calculated by treating a position with the highest similarity as a corresponding position. If there is no occlusion, motion vectors are calculated by the number of the points of interest 404 set on the reference image (the first image 401). A motion vector is represented by a vector whose start point is the position of the point of interest 404 in each reference image and whose end point is the position of the corresponding point in the search image 402:

[Formula 3]

$(x,y,x',y')_i i=1, \ldots, m(m:\text{number of motion vectors})$ (Expression 3)

Alternatively, for the expression of motion vectors, the following formula focusing a vector change component may also be employed in order to mainly reduce memory capacity:

[Formula 4]

$(\Delta x, \Delta y)_i, i=1, \ldots, m(\Delta x=x'-x, \Delta y=y'-y)$ (Expression 3')

Polynomial fitting may also be performed on a correlation score in a search region so as to calculate a peak position of similarity with high accuracy. A template image and a search image may also be subject to high pixelating processing or the like so as to calculate its trajectory of motion vector or a corresponding point with sub-pixel accuracy.

In the above processing, a description has been given of block matching in which the points of interest 404 are fixedly arranged in a grid pattern. In addition, a feature point which facilitates calculation of motion vector may be extracted on a reference image so as to perform vector search using the position as a point of interest. An image processing filter such as the Harris operator may be used for extraction of a point of interest.

The Harris operator firstly determines the size of a window W, and then calculates a differentiated image $(I_{dx}, I_{dy})$ in the horizontal direction and the vertical direction. A Sobel filter or the like may be used for calculation of a differentiated image.

$h=\lfloor 1,\sqrt{2},1 \rfloor/(2+\sqrt{2})$ [Formula 5]

For example, a 3×3 filter $h_x$ in which h represented by Formula 5 is set in the transverse direction and three filters are arranged in the longitudinal direction and a 3×3 filter $h_y$ in which h represented by Formula 5 is set in the longitudinal direction and three filters are arranged in the transverse direction are applied for an image. A differentiated image $(I_{dx}, I_{dy})$ is obtained by the filtering processing.

Next, the following matrix G is calculated by using the window W for the entire coordinates (x, y) in an image.

[Formula 6]

$$G = \begin{bmatrix} \sum_W I_x^2 & \sum_W I_x I_x \\ \sum_W I_x I_x & \sum_W I_y^2 \end{bmatrix}$$

(Expression 4)

Feature points (Expression 4) rder of coordinates (x, y) having a large minimum singular value for matrix G. At this time, it is preferable that feature points are not tightly packed. Thus, limitation is provided such that feature points are not calculated more than necessity in the periphery of the window W of coordinates (x, y) in which a feature point has already been extracted.

In the case of images of successive frames, template matching may be performed by calculating a feature point again or template matching may also be performed between new frames using the end point of the obtained motion vector as a point of interest so as to trace the trajectory of a feature point. Table matching may also be performed between feature points calculated in the respective frames by using a feature amount as key information so as to perform association matching. For example, the throughput of redundant association matching can be reduced by the use of the graph algorithm.

Figure 5:
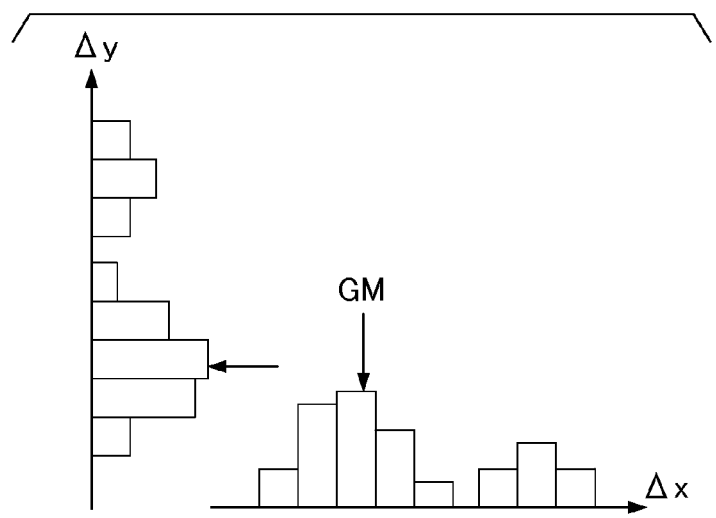
FIG. 5 is a diagram illustrating two-dimensional histogram processing.

The translational motion detecting unit 7 performs processing for calculating the translational motion amount of an image based on the motion amounts obtained at a plurality of positions in the image. The translational motion amount of an object of interest in an image may also be calculated using clustering or the like. When there is no need to specify an object, histogram processing is performed for both the horizontal and vertical axis directions. In this manner, the translational motion amount is obtained as a global vector per one group between frames. FIG. 5 shows the frequency distribution of a horizontal direction motion component Δx plotted on the horizontal axis and the frequency distribution of a vertical direction motion component Δy plotted on the vertical axis. In FIG. 5, histogram is shown by rectangular frames in the respective directions. As shown in FIG. 5, processing for forming two-dimensional histogram for horizontal and vertical direction motion components at a plurality of positions in an image in both the horizontal and vertical directions is executed so as to calculate its maximum bin motion amount as a global motion (GM).

Next, a description will be given of processing performed by the in-plane rotational motion detecting unit 8. The in-plane rotational motion detecting unit 8 performs rotational motion detection processing using detection information obtained by an attitude detection sensor exhibiting a high sampling frequency and an excellent responsibility. Alternatively, as in translational motion amount detection, the rotational motion may also be calculated from image information acquired from the pre-processing unit 5. For example, when a global vector is subtracted from a local vector in an image, the main motion from among the remaining image motion components is determined as an in-plane rotational motion. The in-plane rotation angle (hereinafter referred to as "θ") satisfying the following formula is calculated by least-squares fitting processing for the corresponding point coordinates $(x_i, y_i)$ and $(x'_i, y'_i)$ (i=1, 2, . . . ) at the front and rear of a frame in which a global vector has been subtracted from a local vector.

[Formula 7]

$$\begin{bmatrix} x'_i \\ y'_i \end{bmatrix} = \begin{pmatrix} \cos\theta & \sin\theta \\ -\sin\theta & \cos\theta \end{pmatrix} \begin{bmatrix} x_i \\ y_i \end{bmatrix} \quad \text{(Expression 5)}$$

Figure 6:
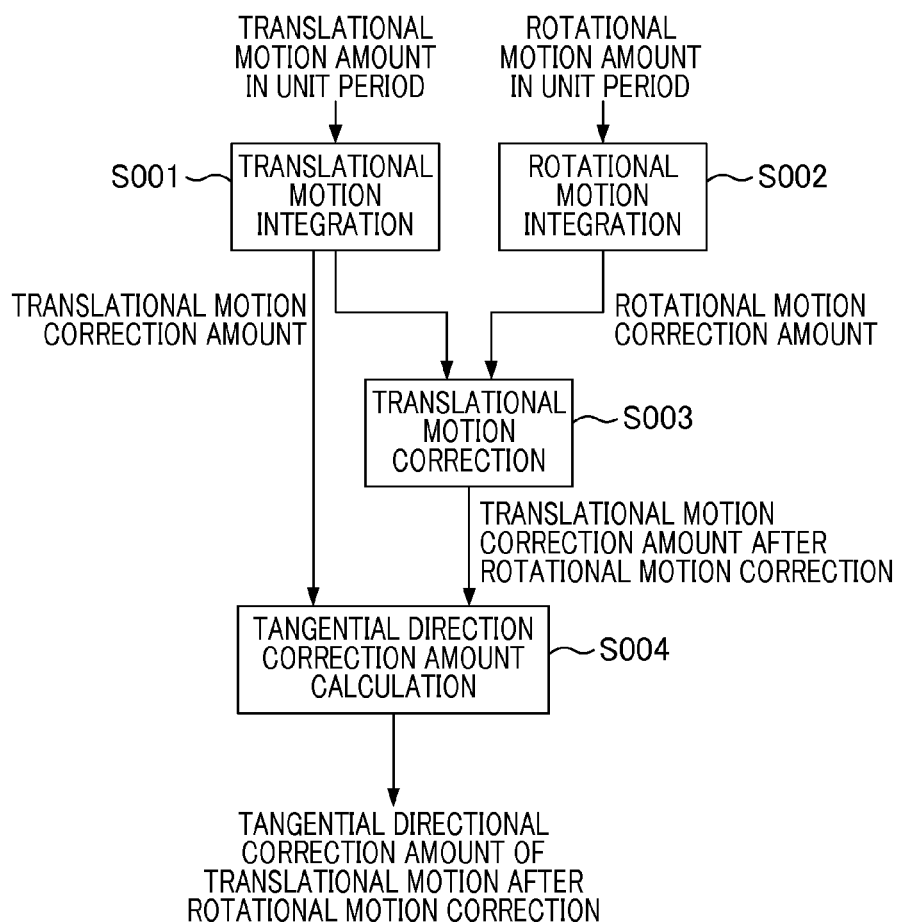
FIG. 6 is a diagram illustrating a tangential direction correction amount calculation procedure.

Next, a description will be given of a specific content of calculation processing for a translational motion correction amount excluding a rotational motion correction amount by the geometric deforming unit 9 with reference to FIG. 6. FIG. 6 is a flowchart illustrating a series of processing performed in sequence from an upper level to a lower level such as from step S001 to step S004. In the translational motion integration step shown in step S001, the translational motion detecting unit 7 integrates the translational motion amount of an image obtained at a predetermined sampling period (unit period). In the rotational motion integration step shown in step S002, the in-plane rotational motion detecting unit 8 integrates the rotational motion amount of an imaging apparatus obtained at a predetermined sampling period. A sampling period relating to a translational motion amount depends on a sampling period or a field period of an image obtained by, for example, the imaging element 2 or a processing period of the translational motion detecting unit 7 (e.g., period such as 30 fps, 60 fps, or the like). On the other hand, a sampling period relating to an in-plane rotational motion amount is a period corresponding to a few kilo Hz when the in-plane rotational motion detecting unit 8 includes an attitude detection sensor or the like. When the in-plane rotational motion detecting unit 8 detects an in-plane rotational motion amount from an image, a sampling period relating to an in-plane rotational motion amount is the same as a sampling period relating to a translational motion amount. In integration steps S001 and step S002, integration calculation is executed at a sampling period which is different due to device characteristics of the respective detecting units, transformation for a translational attitude change and an in-plane rotational attitude change is performed at some time in the past of the processing period for the geometric deforming unit 9 as a starting point. The integration processing performed by the translational motion detecting unit 7 and the in-plane rotational motion detecting unit 8 is implemented by, for example, an IIR-type low pass filter. As in the integration processing performed by the optical image shake correction mechanism, the integration processing performed by the translational motion detecting unit 7 and the in-plane rotational motion detecting unit 8 can adjust the frequency band of vibration to be corrected by adjusting the cut-off frequency of the IIR-type low pass filter. Also, the translational motion detecting unit 7 and the in-plane rotational motion detecting unit 8 adjust the reflux gain of the filter, so that the speed of processing for updating an integrated amount in the future direction of time by taking the image shake correction reference position of the past as a starting point can be adjusted. The translational motion detecting unit 7 and the in-plane rotational motion detecting unit 8 uses a low pass filter for integration processing, so that a translational attitude change and an in-plane rotational attitude change can be calculated by taking some time in the past at which vibration has been removed as a starting point.

In the translational motion correction step S003, the geometric deforming unit 9 corrects the translational motion amount (first integrated amount) based on the in-plane rotational motion amount calculated in the integration step S002. When only the in-plane rotational motion amount (second integrated amount) is corrected by the geometric deformation processing in the in-plane rotational direction, the geometric deforming unit 9 calculates the fact that the integrated translational motion amount changes in which vibration direction. In this manner, the translational motion amount corrected by the in-plane rotational motion amount is calculated.

In the tangential direction correction amount calculation step S004, the geometric deforming unit 9 calculates a difference between the translational motion amount calculated in step S001 and the translational motion amount calculated in step S003 after geometric deformation correction in the in-plane rotational direction. In the tangential direction correction amount calculation step S004, the geometric deforming unit 9 calculates the tangential directional component of translational motion which is further oscillated by rotational correction in the in-plane rotational direction. The tangential directional component of the translational motion amount is calculated as a difference between translational motion amounts before and after geometric deformation correction in the in-plane rotational direction. The geometric deforming unit 9 outputs the difference (the tangential directional component of the translational motion amount) between translational motion amounts before and after geometric deformation correction in the in-plane rotational direction as a correction amount. In the correction amount calculation processing in step S004, the geometric deforming unit 9 calculates the fact that what kind of change is made for vibration depending on time direction, i.e., a difference in a correction amount between frames. When the amount of change in the translational motion amount is large enough to be detected within a captured image, the geometric deformation processing in the in-plane rotational direction has an effect for rotating the vibration direction of the translational motion. Consequently, vibration in the vibration direction is perceived by a viewer. The geometric deforming unit 9 performs geometric deformation processing for rotational correction in the in-plane rotational direction using the tangential directional component of the translational motion amount obtained in step S004. In this manner, directional vibration of the residual translational motion component caused by additional rotational correction of the image obtained by optical image shake correction in the in-plane rotational direction can be suppressed. More specifically, the following correction formula is used.

[Formula 8]

$$\begin{bmatrix} x' \\ y' \end{bmatrix} = \begin{pmatrix} \cos\theta & -\sin\theta \\ \sin\theta & \cos\theta \end{pmatrix} \begin{bmatrix} x \\ y \end{bmatrix} + \begin{bmatrix} a \\ b \end{bmatrix} \quad \text{(Expression 6)}$$

The symbol "θ" in (Expression 6) represents an in-plane rotational correction amount, and its cosine and sine functions are components in a rotation matrix. The symbols "a" and "b" represent two components of a two-dimensional vector and are the tangential directional components (correction amounts) of translational motion amounts in the horizontal and vertical directions corresponding to "θ", respectively. In many cases, the center of an image corresponding to the intersection of the optical axis of the optical system with an imaging element plane is used as a transformation reference in the image.

The geometric deforming unit 9 performs the aforementioned rotational correction and translational correction for correcting the tangential directional component. In other words, the geometric deforming unit 9 performs Euclidean geometric deformation consisting of rotational and translational correction processing. For example, the geometric deformation processing can be implemented by using a geometric deformation circuit based on forward mapping or backward mapping for calculating a pixel value for each pixel. During the geometric deformation processing, distortion caused by the nature of the optical system may be additionally corrected or rolling shutter distortion which may be caused by the use of a CMOS sensor may also be additionally corrected. For a forward and backward perspective relationship between the geometric deformation processing in the present embodiment and geometric deformation processing for additional distortion and rolling shutter distortion, both processing operations can be realized in accordance with laws of physics by being applied in sequence in accordance with a geometrical nature.

According to the present embodiment, an imaging apparatus provided with an optical image shake correction mechanism which is operated in a lens barrel detects a secondary vibration which may occur when in-plane rotational motion correction for an image obtained by optical image shake correction is further performed by electronic image shake correction. In this manner, a secondary vibration can be corrected. Thus, even when in-plane rotational correction is performed, natural image shake correction (image shake correction corresponding to shooting of moving images upon shooting while walking) for moving image can be realized.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-049252, filed on Mar. 12, 2013, which is hereby incorporated by reference herein in its entirety.

What is claimed is:

1. An imaging apparatus comprising:
   an imaging unit configured to capture an object via an optical system; and
   an image shake correcting unit configured to correct image shake of an image captured by the imaging unit,
   wherein the image shake correcting unit comprises:
     a first image shake correcting unit configured to optically correct the image shake of the image by a motion of an optical member; and
     a second image shake correcting unit configured to perform image shake correction by processing the image captured by the imaging unit, and
   wherein the second image shake correcting unit comprises:
     a first detecting unit configured to detect a motion of the image in a translational direction in a plane perpendicular to an optical axis of the optical system as a translational motion amount from the image optically corrected by the first image shake correcting unit;
     a second detecting unit configured to detect a motion of the image in a rotational direction about the optical axis of the optical system as a rotational motion amount; and
     a geometric deforming unit configured to acquire the translational motion amount and the rotational motion amount, perform correction by rotating the captured image in accordance with the rotational motion amount with respect to the translational motion amount, and calculate a tangential directional component of the motion of the image in the translational direction generated by the correction so as to correct the motion of the image by geometric deformation processing.

2. The imaging apparatus according to claim 1, wherein the first detecting unit detects the translational motion amount to calculate a first integrated amount, the second detecting unit detects the rotational motion amount to calculate a second integrated amount, and the geometric deforming unit acquires the first integrated amount and the second integrated amount, performs correction by rotating the image with respect to the first integrated amount in accordance with the second integrated amount, calculates a difference between an integrated amount after correction and the first integrated amount prior to correction, and calculates a tangential directional component of the motion of the image in the translational direction so as to correct the motion of the image generated by the correction.

3. The imaging apparatus according to claim 1, wherein the second detecting unit detects an attitude of the imaging apparatus to calculate the rotational motion amount.

4. The imaging apparatus according to claim 1, further comprising:
   an image processing unit configured to process the image captured by the imaging unit,
   wherein the second detecting unit calculates the rotational motion amount from image information acquired from the image processing unit.

5. The imaging apparatus according to claim 4, wherein the first detecting unit calculates a motion vector of an image from the image information acquired from the image processing unit.

6. The imaging apparatus according to claim 5, wherein the first image shake correcting unit performs integration processing for passing through a frequency component which is equal to or less than a threshold value relating to a motion of a moving image, and the first detecting unit acquires information about the moving image optically corrected by the first image shake correcting unit from the image processing unit so as to calculate a motion amount of the moving image in a translational direction.

7. The imaging apparatus according to claim 4, wherein the first detecting unit acquires information about a first image and information about a second image which is later in time than the first image from the image processing unit, and calculate information in which a point of interest in the first image is set to a start point and the position of a point corresponding to the point of interest in the second image is set to an end point so as to calculate the translational motion amount.

8. A control method to be executed by an imaging apparatus that comprises an imaging unit configured to capture an object via an optical system and image shake correcting unit configured to correct image shake of an image captured by the imaging unit and performs first image shake correction for optically correcting the image shake of the image by a motion of an optical member and second image shake correction for correcting image shake by processing the image captured by the imaging unit, wherein the second image shake correction comprises:

detecting a motion of the image in a translational direction in a plane perpendicular to an optical axis of the optical system as a translational motion amount from the image optically corrected by the first image shake correction;

detecting a motion of the image in a rotational direction about the optical axis of the optical system as a rotational motion amount; and acquiring the translational motion amount and the rotational motion amount, performing correction by rotating the captured image in accordance with the rotational motion amount with respect to the translational motion amount, and calculating a tangential directional component of the motion of the image in the translational direction generated by the correction so as to correct the motion of the image by geometric deformation processing.

* * * * *